United States Patent
Dobras

(10) Patent No.: US 7,503,443 B1
(45) Date of Patent: Mar. 17, 2009

(54) TORQUE CONTROL MECHANISM

(75) Inventor: Frederick P. Dobras, Seekonk, MA (US)

(73) Assignee: Seekonk Manufacturing Company, Inc., Seekonk, MA (US)

(*) Notice: Subject to any disclaimer, the term of this patent is extended or adjusted under 35 U.S.C. 154(b) by 201 days.

(21) Appl. No.: 11/416,435

(22) Filed: May 2, 2006

(51) Int. Cl.
  F16D 47/04    (2006.01)
  F16D 43/206   (2006.01)
  F16D 7/08     (2006.01)
  B25B 23/157   (2006.01)

(52) U.S. Cl. ............... 192/48.6; 192/48.92; 192/55.1; 464/36; 81/60; 81/474

(58) Field of Classification Search ............... 192/55.1, 192/56.62, 48.3, 48.92, 46, 48.6; 464/36; 81/60, 61, 473, 474, 476
See application file for complete search history.

(56) References Cited

U.S. PATENT DOCUMENTS

| | | | | |
|---|---|---|---|---|
| 2,732,746 A | * | 1/1956 | Livermont | 81/474 |
| 3,020,789 A | * | 2/1962 | Etzkorn | 81/474 |
| 3,137,187 A | | 6/1964 | Van Hoose | |
| 3,722,644 A | * | 3/1973 | Steinhagen | 192/56.57 |
| 3,937,036 A | * | 2/1976 | Sauerwein | 464/36 |
| 4,006,608 A | * | 2/1977 | Vuceta | 192/56.57 |
| 4,060,211 A | * | 11/1977 | Takada | 242/385.3 |
| 4,174,621 A | * | 11/1979 | Woltjen | 464/36 |
| 4,317,511 A | * | 3/1982 | Asai | 192/56.57 |
| 4,515,044 A | * | 5/1985 | Harstad | 81/61 |
| 5,576,501 A | | 11/1996 | Huang | |
| 5,868,231 A | * | 2/1999 | Kampf | 192/56.5 |
| 5,896,968 A | * | 4/1999 | Bruntz | 192/56.57 |
| 6,050,165 A | | 4/2000 | Hall | |
| 6,131,489 A | | 10/2000 | Yang | |
| 6,132,435 A | * | 10/2000 | Young | 606/104 |
| 6,138,539 A | | 10/2000 | Carchidi et al. | |
| 6,312,339 B1 | * | 11/2001 | Beyert | 464/30 |
| 7,066,691 B2 | * | 6/2006 | Doyle et al. | 408/124 |
| 7,137,329 B1 | * | 11/2006 | Moser | 83/543 |
| 7,213,491 B1 | * | 5/2007 | Thompson et al. | 81/58.3 |

\* cited by examiner

*Primary Examiner*—Rodney H Bonck
*Assistant Examiner*—John V Ligerakis
(74) *Attorney, Agent, or Firm*—Salter & Michaelson

(57) ABSTRACT

A torque limiting device that includes a body, an output race including a distal portion extending from the body for supporting a tool that is to be controlled from the body and a proximal portion formed as a radial flange and a plurality of ball bearings disposed in a plurality of accommodating holes arranged about the flange. A first thrust member is disposed at the distal portion side of the flange and an actuator plate is providing having a peripheral ratchet surface and a plurality of holes arranged in line with certain holes in the flange. A pawl is supported by the body for engagement with the ratchet surface. A second thrust member imposes a force on the actuator plate toward the output race. The balls supported by the output race transfer axial force therethrough between the actuator plate and the first thrust member.

6 Claims, 8 Drawing Sheets

US 7,503,443 B1

TORQUE CONTROL MECHANISM

TECHNICAL FIELD

The present invention relates in general to torque devices and pertains, more particularly, to torque limiting mechanisms. The concepts of the present invention may be applied to a wide variety of torque control mechanisms including, but not limited to, wrenches and mechanical drivers.

BACKGROUND OF THE INVENTION

Torque control mechanisms are disclosed by way of example in U.S. Pat. No. 5,576,501 to Huang and U.S. Pat. No. 6,131,489 to Yang. Existing torque limiting mechanisms are characterized by excessive lateral thrust forces imposed on the output drive. To minimize these lateral forces existing mechanisms are relatively complex in construction and many times require additional components such as support bearings.

Accordingly, it is an object of the present invention to provide an improved torque control mechanism in which lateral thrust forces are minimized.

Another object of the present invention is to provide a floating torque mechanism having precise torque limiting action without significant thrust forces in the drive output to the tool.

Still another object of the present invention is to provide an improved torque control mechanism that does not require any lubrication for its operation.

Still a further object of the present invention is to provide an improved torque limiting mechanism that is characterized by virtually no backlash.

A further object of the present invention is to provide an improved torque control mechanism that is constructed so as to be operable over a wide temperature range even to temperatures below −40 degrees C.

SUMMARY OF THE INVENTION

To accomplish the foregoing and other objects, features and advantages of the present invention there is provided a torque device that is characterized by minimal lateral forces on the output tool. One embodiment of the torque control mechanism is comprised of a body; an output race including a distal portion extending from the body for supporting a tool that is to be controlled from the body and a proximal portion formed as a radial flange; a plurality of ball bearings disposed in a plurality of accommodating holes arranged about the flange; a first thrust member on the distal portion side of the flange; an actuator plate having a peripheral ratchet surface and a plurality of holes arranged in line with the holes in the flange; a pawl supported by the body and for engagement with the ratchet surface and a second thrust member for imposing a force on the actuator plate toward the output race. The balls are supported by the output race while transferring axial force therethrough between the actuator plate and the first thrust member.

In accordance with other aspects of the present invention the flange preferably has a thickness less than the diameter of each ball bearing so that the primary contact of each ball is between the actuator plate and first thrust member; at least some of the holes in the actuator plate engage balls; there are preferably a greater number of holes in the actuator plate than in the flange; the holes in both the actuator plate and flange are preferably disposed about the same circular locus; the first thrust member may include a thrust bearing and at least one thrust washer having a flat surface that the balls are adapted to contact; the first thrust member may also be comprised of a Belleville washer and a distal end cap and retainer ring; the second thrust member may be comprised of an adjustment nut, a single ball and a set screw for adjusting the tension imposed by the second thrust member; the thrust ball preferably engages a center hole in the actuator plate and is engaged by the set screw that engages with internal threads in the adjusting nut with the adjusting nut being supported in the body and the pawl may comprise a pawl clip having oppositely disposed keys that are adapted for engagement with the ratchet surface of the actuator plate.

In accordance with another embodiment of the present invention there is provided a torque device that is comprised of a body; an output race including a distal portion extending from the body for supporting a tool that is to be controlled from the body and a proximal portion formed as a radial flange; a plurality of ball bearings disposed in a plurality of accommodating holes arranged about the flange; an actuator plate having a peripheral ratchet surface and a plurality of holes arranged in line with the holes in the flange; a pawl supported by the body and for engagement with the ratchet surface; and thrust means for providing a force between a thrust surface and the actuator plate. The balls are supported by the output race while transferring axial force therethrough between the actuator plate and the thrust surface. The flange has a thickness less than the diameter of each ball bearing so that the primary contact of each ball is between the actuator plate and thrust surface without imposing any substantial lateral force on the output race.

In accordance with still other aspects of the present invention the thrust means preferably comprises a first thrust member on the distal portion side of the flange and a second thrust member for imposing a force on the actuator plate toward the output race; at least some of the holes in the actuator plate engage balls; there are a greater number of holes in the actuator plate than in the flange; the holes in both the actuator plate and flange are disposed about the same circular locus; the first thrust member includes a thrust bearing and at least one thrust washer having a flat surface that the balls are adapted to contact; the first thrust member also is comprised of a Belleville washer and a distal end cap and retainer ring; the second thrust member is comprised of an adjustment nut, a single ball and a set screw for adjusting the tension imposed by the second thrust member and the pawl comprises a pawl clip having oppositely disposed keys that are adapted for engagement with the ratchet surface of the actuator plate.

DETAILED DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1:
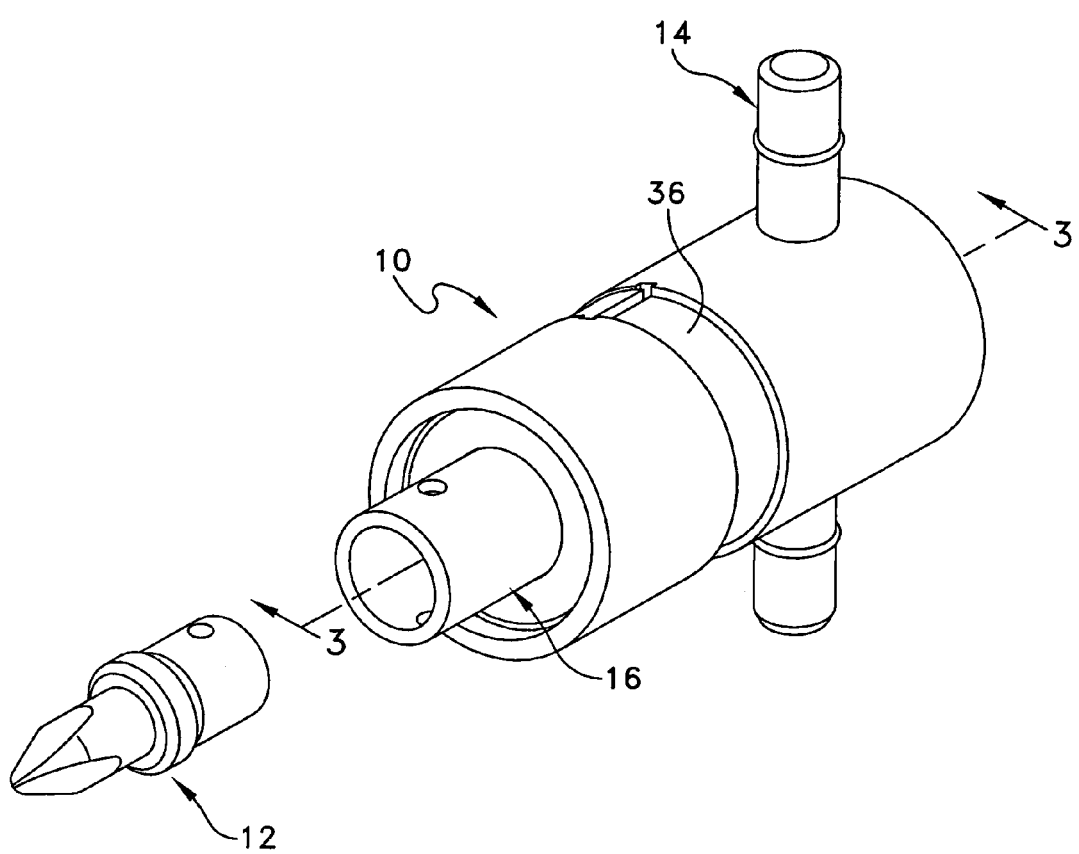
FIG. 1 is a perspective view of one embodiment of a torque control mechanism constructed in accordance with the principles of the present invention.

FIG. 1 illustrates a torque limiting mechanism constructed in accordance with the principles of the present invention. This mechanism comprises a body 10 that is adapted to releasably support a tool 12. A handle 14 is supported within the body 10 and used to rotate the torque mechanism. In FIG. 1 the tool 12 is shown exploded away from but is supported by the transfer race 16. In FIG. 1 the tool 12 is in the form of a head member having a Phillips type screw driver tool. In accordance with the present invention, the tool 12 may be of many different forms in addition to that specifically disclosed in FIG. 1. Another typical tool is a hex bit into a hex adaptor. Also, a particular type of handle 14 is disclosed in FIG. 1 but it is understood that other types of handle arrangements may also be employed with the body 10. Moreover, FIG. 1 shows a standard detent arrangement for holding the tool to the mechanism, however, other types of holding and release mechanisms may also be used.

Reference is now made to FIGS. 2-5 for further details of the torque control mechanism. The minimizing of lateral forces comes about by providing the transfer race 16 with a series of balls or ball bearings 18 supported within the transfer race 16. Forces imposed on the slip actuator 20 are transferred primarily via the series of balls 18 to the thrust washer 22. In this way the thrust force on the transfer race 16 that is imposed from the rotation of the body, is minimized.

Figure 2:
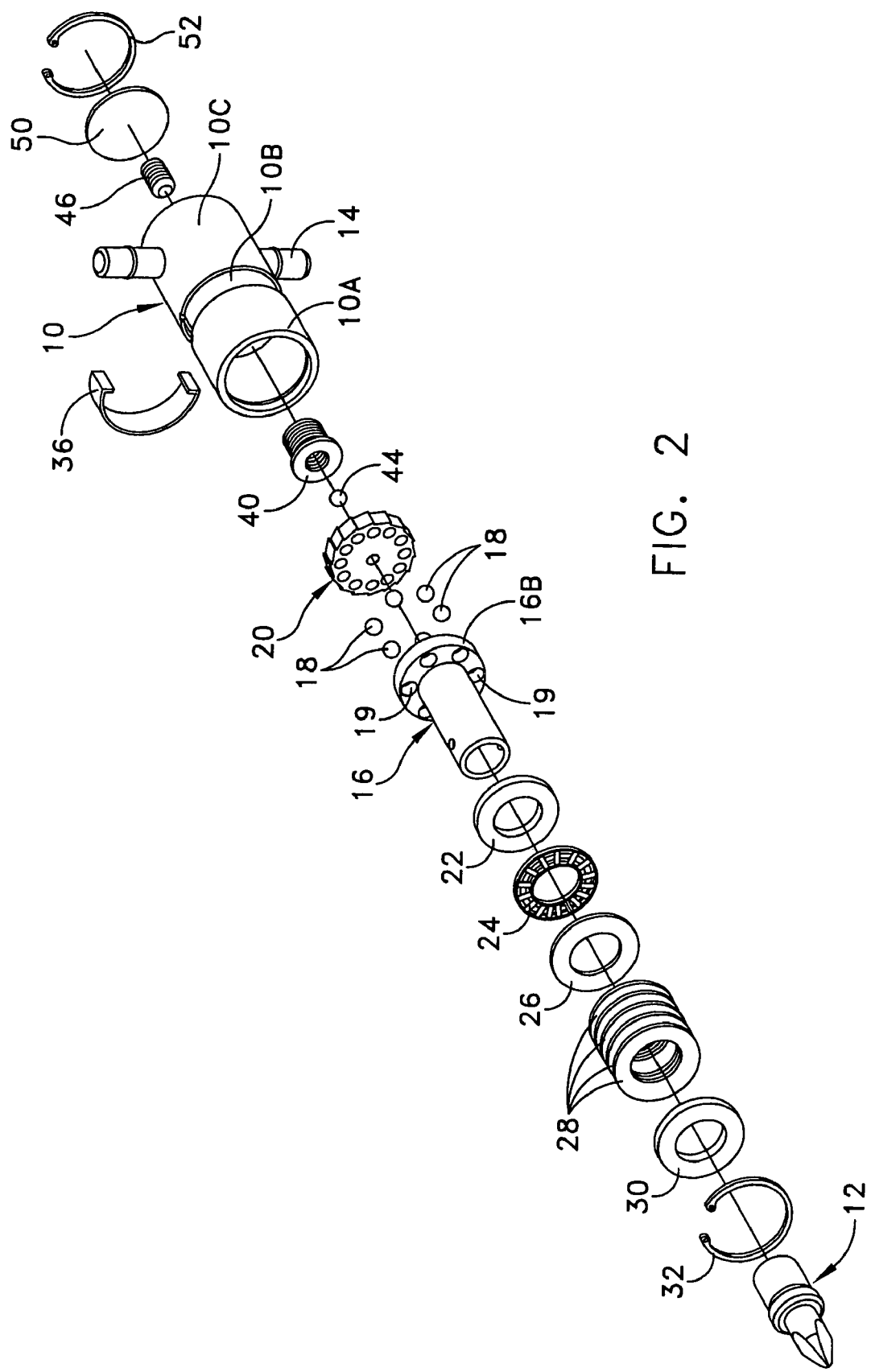
FIG. 2 is an exploded perspective view showing all of the various components that comprise the torque mechanism of FIG. 1.
Figure 3:
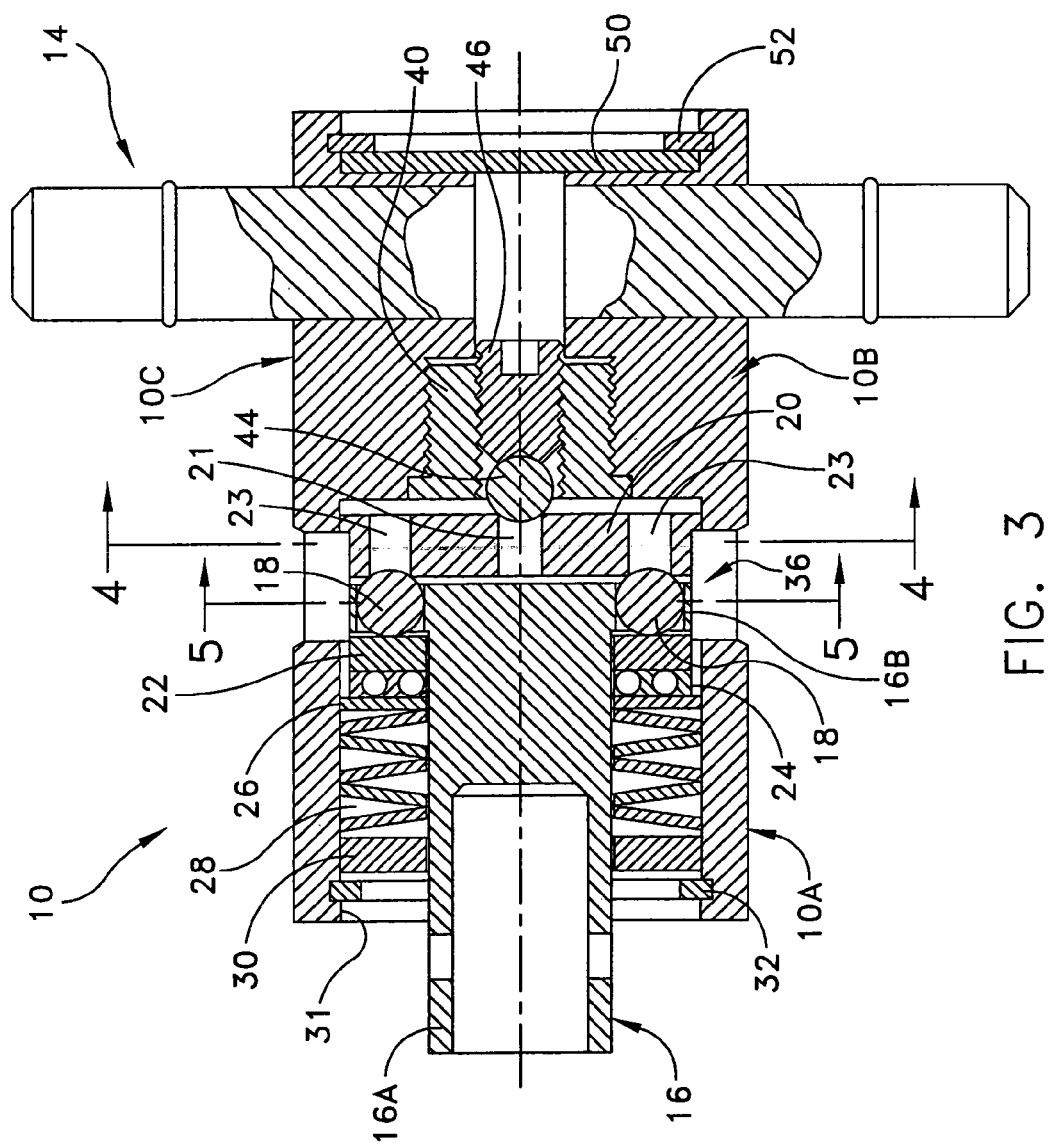
FIG. 3 is a longitudinal cross-sectional view taken along line 3-3 of FIG. 1.

As illustrated in FIGS. 2 and 3, the mechanism also includes a thrust bearing 24, washer 26, Belleville washer 28, end cap 30, and a retaining ring 32. These various components are shown in the exploded view of FIG. 2. FIG. 3 illustrates the same components disposed within a bore 31 of the output section 10A of the body 10. In an alternate embodiment of the present invention, the bearing 24 and washer 26 may be removed in which case the thrust washer 22 bears against the Belleville washer 28.

Figure 6:
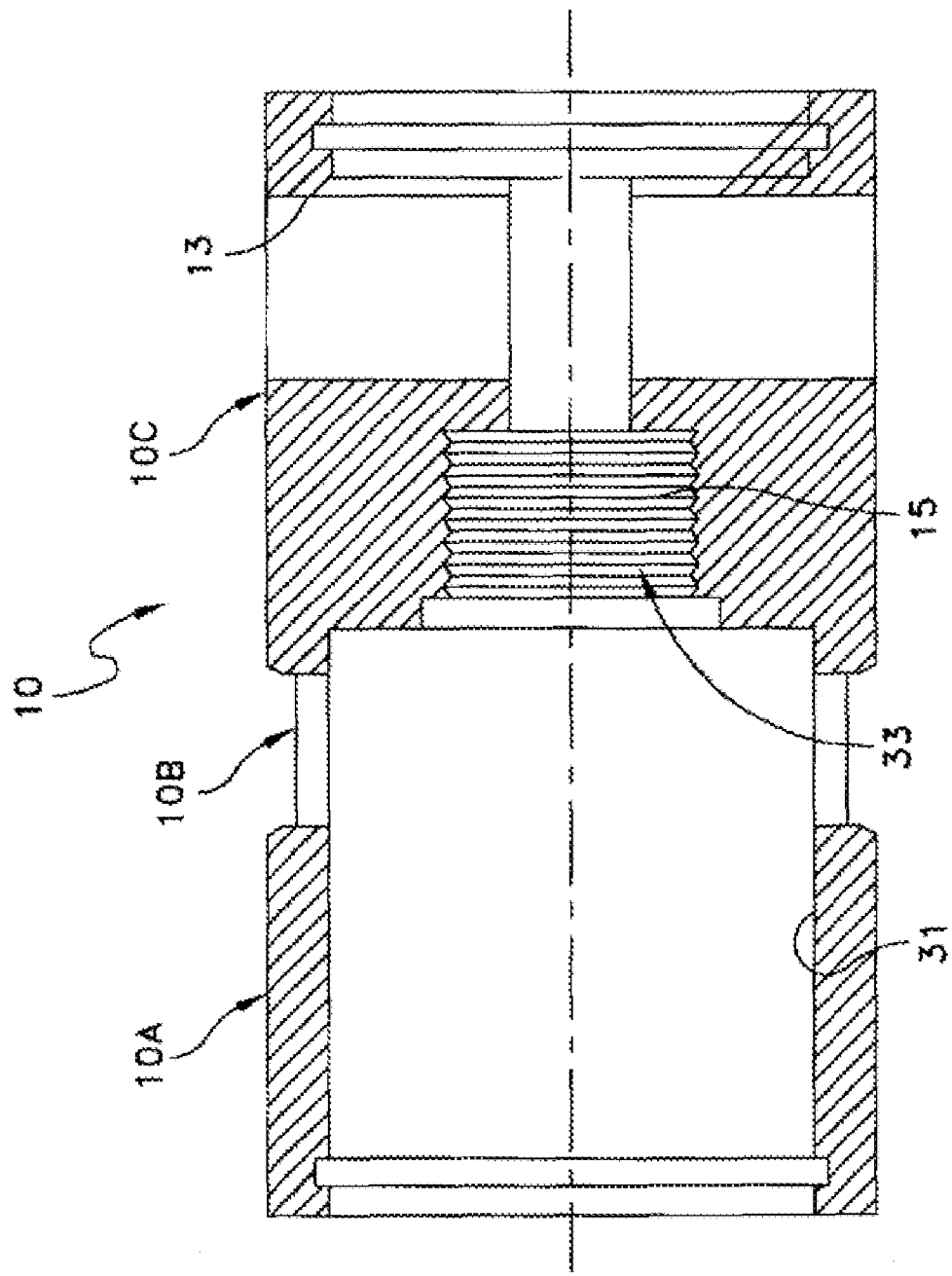
FIG. 6 is a cross-sectional view of just the body of the mechanism of FIG. 1.

FIG. 6 illustrates the body 10 without any components having been mounted therein. The body 10 includes the output section 10A that was previously referenced. The body also includes a smaller diameter middle section 10B for receiving the pawl clip 36. The body 10 also includes a more proximal section 10C having a passage 13 for receiving the handle 14. The main bore 33 of the section 10C is also threaded at 15 to receive the adjustment nut 40.

Figure 5:
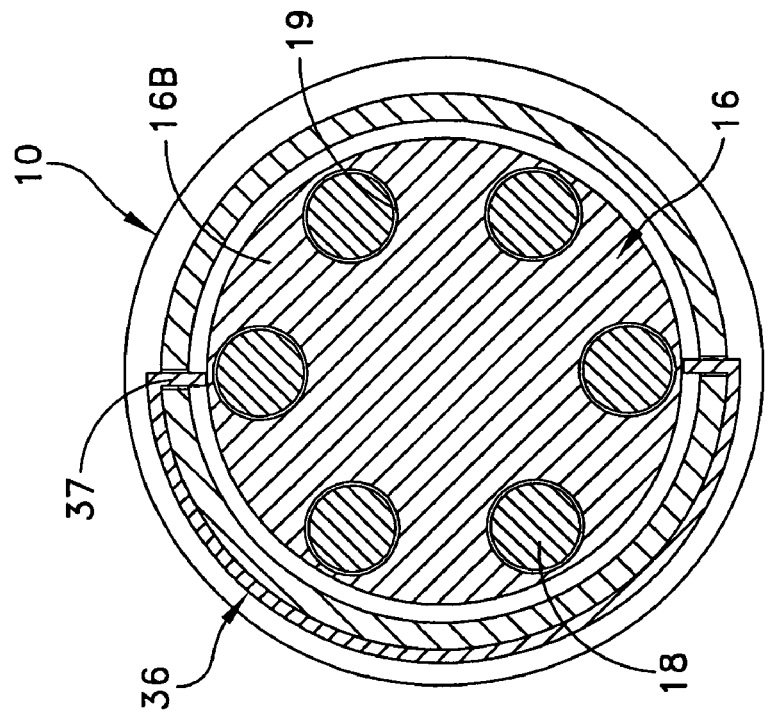
FIG. 5 is a transverse cross-sectional view taken along line 5-5 of FIG. 3.

The transfer race 16 includes an output post 16A for receiving the tool 12 and a radially extending flange 16B that is used to support the balls 18. The flange 16B has a series of holes 19 which in the disclosed embodiment are six holes disposed about the flange, such as illustrated in FIGS. 2 and 5. These holes 19 are each of a diameter so that the balls 18 are accommodated therein but can slide therethrough. As can be seen from FIG. 3, the diameter of each ball 18 is greater than the thickness of the flange 16B and in that way any force from the slip actuator 20 imposed on the balls 18 is conveyed through the balls to the thrust washer 22 and not to the flange 16B. Refer also to FIG. 5 which is a cross-sectional view illustrating the flange 16B and the balls 18 disposed within their respective holes 19.

Figure 4:
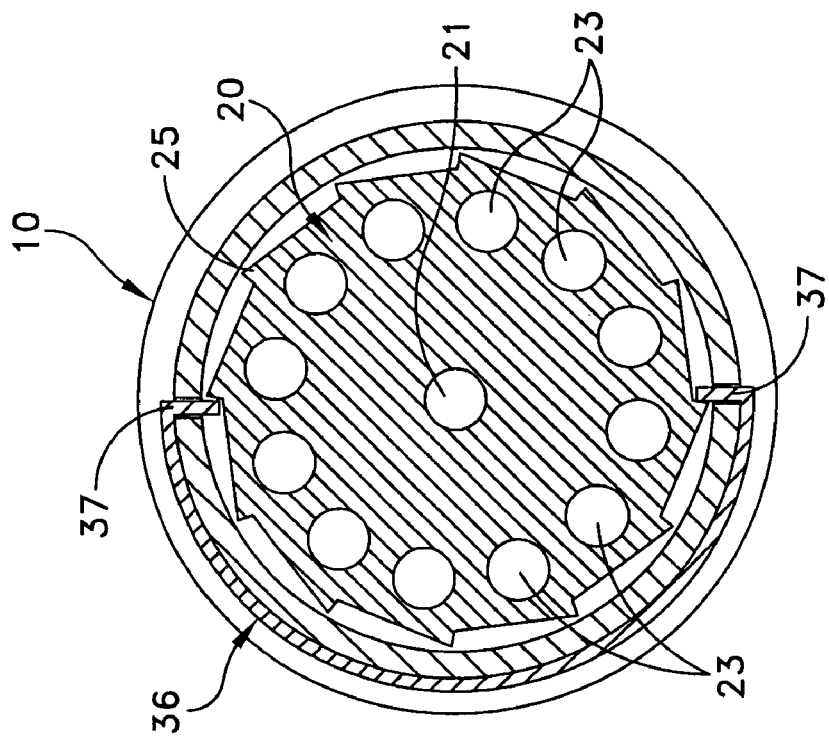
FIG. 4 is a transverse cross-sectional view taken along line 4-4 of FIG. 3.

FIGS. 2-4 also show further details of the slip actuator 20. The slip actuator 20 includes a center hole 21 against which an adjusting ball 44 is urged as illustrated in FIG. 3. The slip actuator 20 also includes a series of peripherally disposed holes 23 every other one of which is in alignment with a corresponding hole 19 in the flange 16B. In the disclosed embodiment the number of holes 23 is twelve while the number of holes in the flange 16B is six. It is preferred that the number of holes in the slip actuator be greater than the number of holes in the transfer race flange 16B. The number of holes 23 determine the incremental ratcheting. As illustrated in FIG. 4, the slip actuator 20 also includes an outer ratchet surface with teeth 25. Opposite teeth are shown in FIG. 4 engaged with the pawl keys 37. The teeth 25 are disposed about the complete outer circumference of the slip actuator 20. In the embodiment disclosed the number of teeth 25 are twelve. The number of teeth 25 preferably, but not necessarily, corresponds to the number of holes 23. Also, there need not be any particular relationship between the number of teeth and number of holes or balls. FIG. 4 also illustrates the pawl clip 36 with its opposite bent ends or keys 37 engageable with the teeth of the slip actuator 20. As noted in FIG. 5, the bent ends 37 of the pawl 36 do not engage with the flange 16B.

FIG. 3 illustrates the manner in which the balls 18 align, not only with their residing holes 19 but also with the holes 23 in the slip actuator 20. As indicated previously, the adjustment ball 44 is positioned to impose a force on the slip actuator 20 at its center hole 21. FIG. 3 also illustrates the adjusting set screw 46 that is internally threaded in the adjustment nut 40. FIG. 3 also illustrates the handle 14 extending through the passage 13 in the mechanism body 10. The handle 14 may be releasably locked in position in a number of different ways such as with the use of retaining rings (not shown). The handle 14 may also be provided with a center passage so as to enable ready access to the set screw 46. The very proximal end of the section 10C is also illustrated as being closed by means of the end cap 50 and the retainer ring 52.

Figure 7:
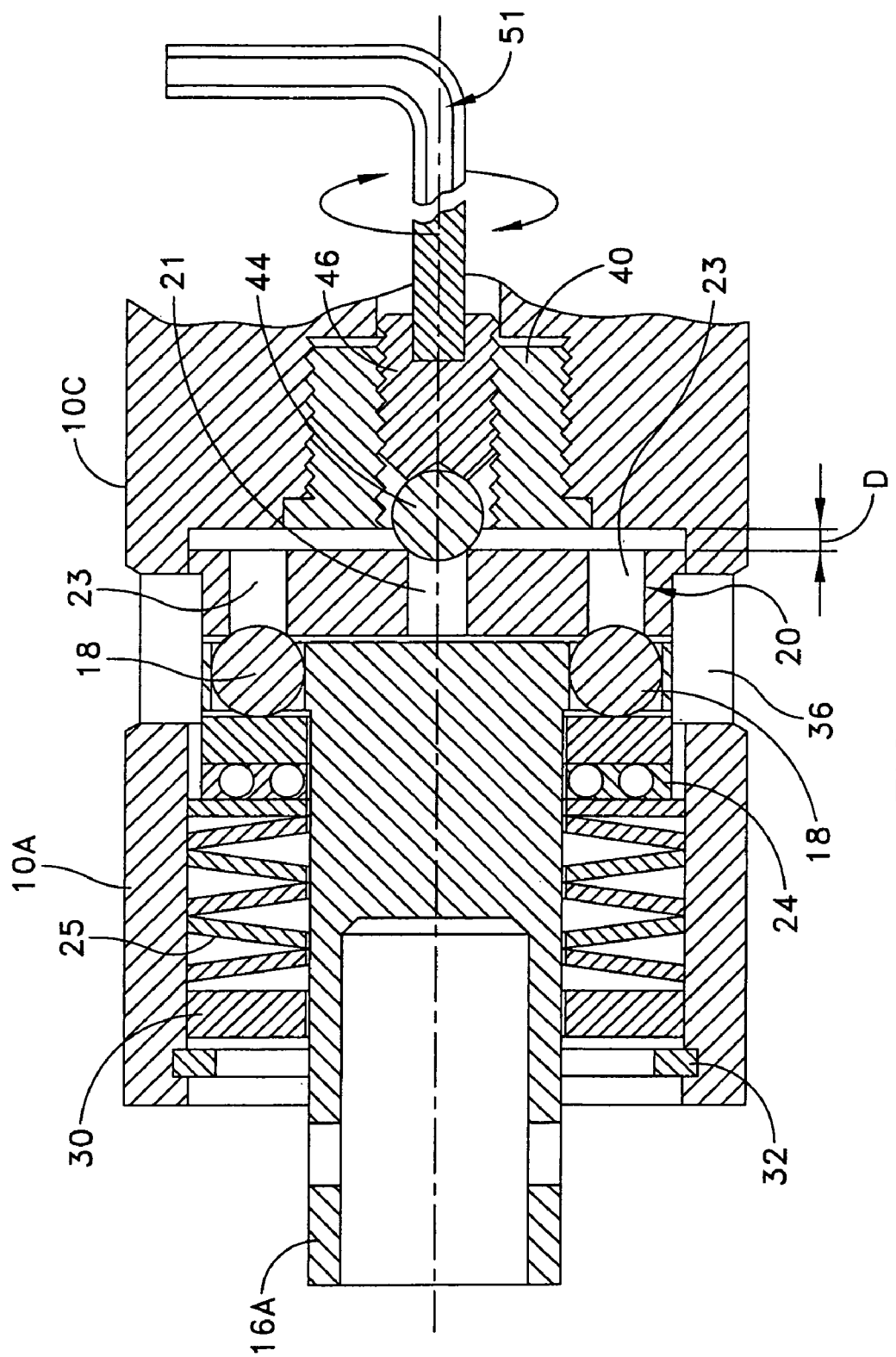
FIG. 7 is a cross-sectional view similar to that shown in FIG. 3 and illustrating an adjusting tool used in adjusting the torque limit of the mechanism.
Figure 8:
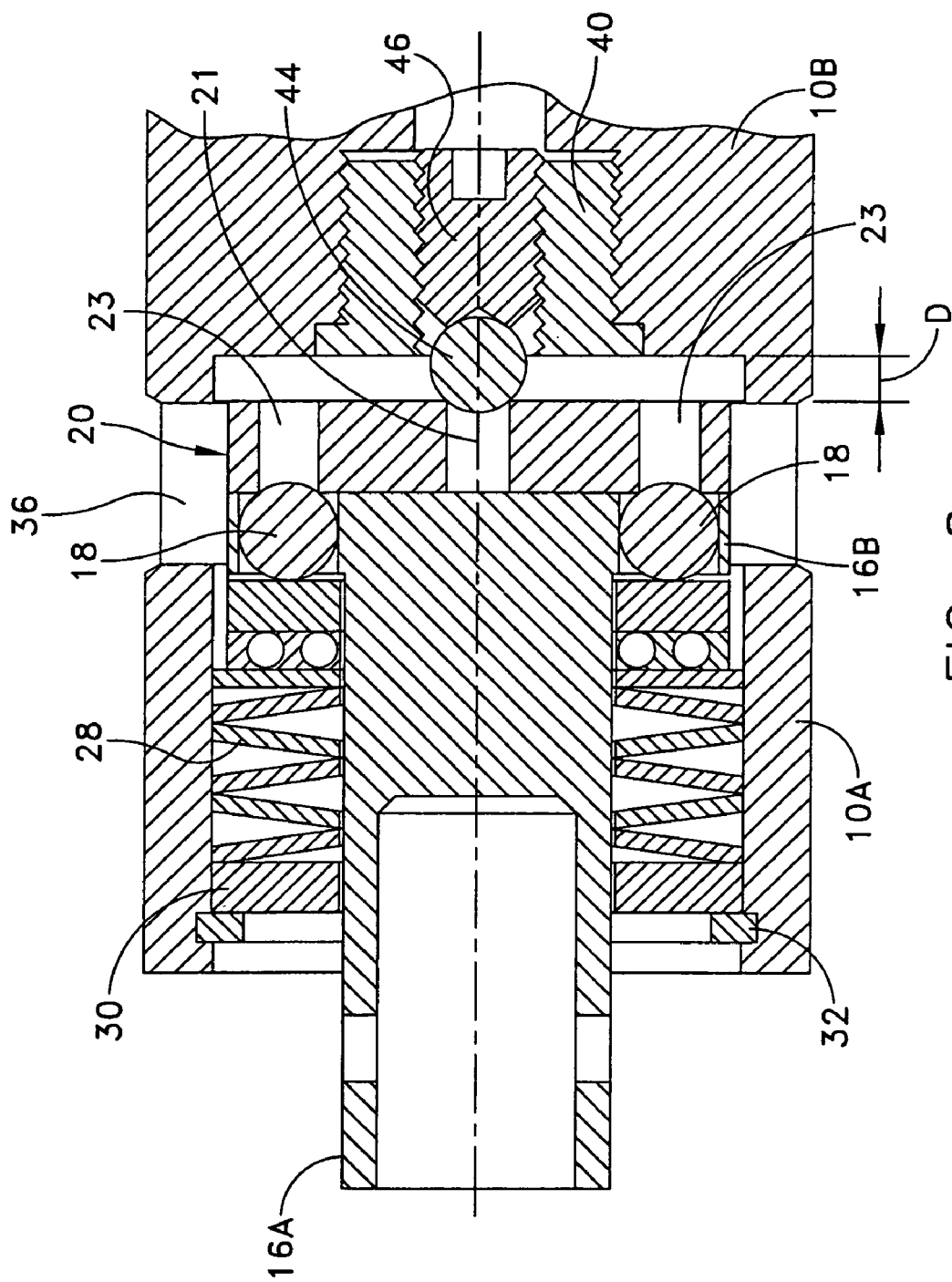
FIG. 8 is a cross-sectional view relating to FIG. 7 and showing a different torque adjustment.

Reference is now made to FIGS. 7 and 8. The cross-sectional views in FIGS. 7 and 8 are similar to that described previously in FIG. 3. FIGS. 7 and 8 show different respective adjustment positions for the set screw 46. FIG. 7 also illustrates adjustment wrench 51 that may be used for adjusting the position of the set screw 46. Wrench 51 may be an "Allen" wrench. The cap 50 and snap ring 52 are removed to calibrate the torque. Alternatively, the cap 50 may be provided with a central hole for receiving the wrench 51. The recessed end of the set screw 46 holds the adjustment ball 44. In FIG. 7 there is less pressure applied than in FIG. 8. Thus, the distance D between the adjustment nut 40 and the slip actuator 20 is smaller in FIG. 7 than in FIG. 8. The further that the set screw is screwed in the greater the pressure applied at the slip actuator 20 and the higher the torque limiting action.

Figure 9:
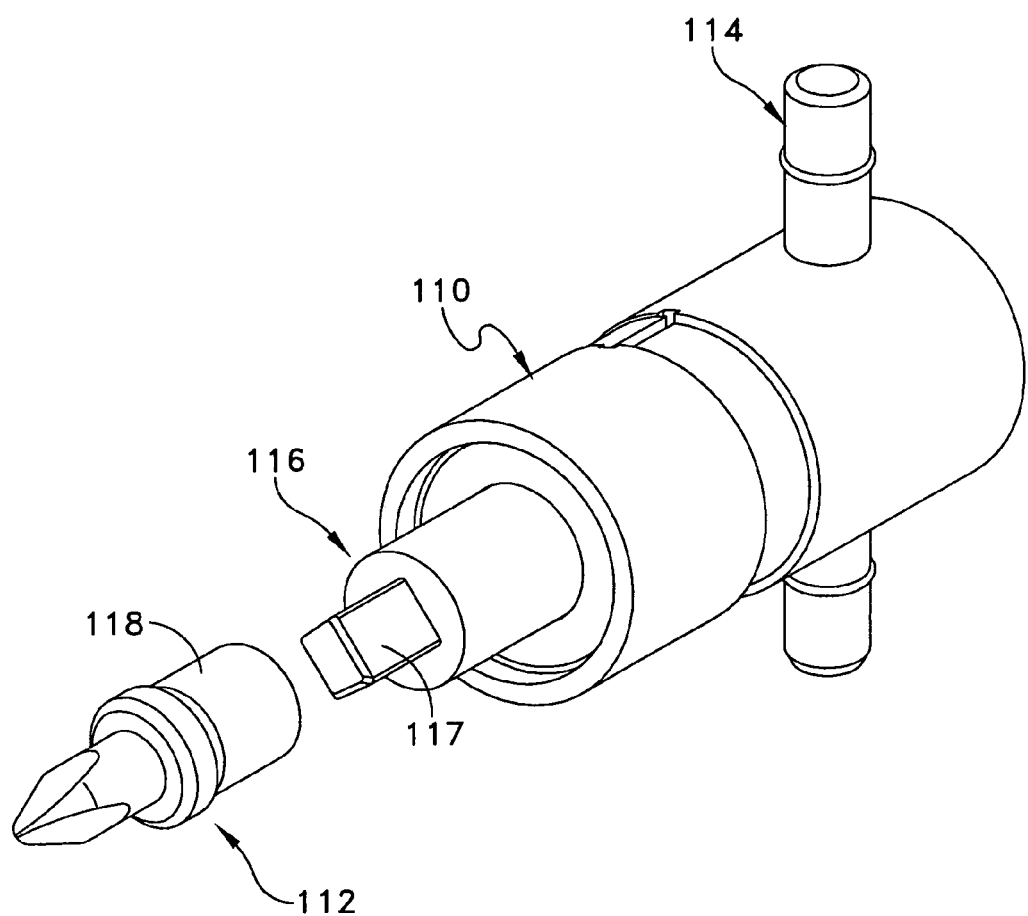
FIG. 9 is a perspective view of an alternate torque mechanism.

Reference is now made to FIG. 9 for an illustration of a slightly different embodiment of the present invention. In FIG. 9 there is a mechanism body 110 including a tool 112 that is supported from the transfer race 116. FIG. 9 also illustrates the handle 114. The internal components within the housing 10 may be substantially identical to that described in FIGS. 1-8. The primary difference in the embodiment of FIG. 9 is that the transfer race 116 includes a male end 117 for engaging with a female end 118 of the tool 112.

In accordance with the present invention, and with reference to, for example, FIG. 3, a rotation of the body 10 by means of the handle 14 causes an engagement of the pawl clip ends with the slip actuator 20 such as is illustrated in FIG. 4. The pawl 36 does not engage the flange 16B. The engagement with the slip actuator 20 causes a rotation of the slip actuator 20. Depending upon the force imposed by the set screw 46, this rotation of the slip actuator is transferred via the balls 18 to the output race 16. This force is imposed from the slip actuator holes 23 through the balls 18 to the thrust washer 22 with little or no lateral force through the transfer race flange 16B.

Having now described a limited number of embodiments of the present invention, it should now become apparent to one skilled in the art that numerous other embodiments and modifications thereof are contemplated as falling within the scope of the present invention as defined by the appended claims.

What is claimed is:

1. A torque device comprising:

a body;

an output race disposed in the body and including a distal portion extending from said body for supporting a tool that is to be controlled from the body and a proximal portion formed as a radial flange;

a plurality of ball bearings disposed in a plurality of accommodating holes arranged about said flange and about a circular locus;

a first thrust member disposed on the distal portion side of the flange and including a thrust bearing and at least one thrust washer having a substantially flat surface that the balls are adapted to contact;

an actuator plate coaxial with said output race, disposed in the body adjacent to the radial flange and on the opposite side to the output race distal portion and having a circumferential ratchet surface with a plurality of ratchet teeth and a plurality of holes at least some of which are arranged in line with the holes in the flange;

said radial flange having a thickness that is less than the diameter of the ball bearings so that the primary contact of each ball is between the actuator plate and thrust washer flat surface without imposing any substantial lateral force on said output race;

a pawl supported by the body and for engagement with said ratchet surface;

said pawl comprising a semicircular pawl clip having opposed bent ends with said semicircular pawl clip supported by the body in a position extending circumferentially about and for engagement with opposed ratchet teeth on the circumferential ratchet surface of the actuator plate;

a second thrust member disposed adjacent to the actuator plate and on the opposite side to the race distal portion and for imposing a force at the center of said actuator plate toward said output race;

wherein said second thrust member is comprised of a centrally arranged adjustment member including a contact ball and a set screw for adjusting the tension imposed on the actuator plate;

said plurality of ball bearings supported by said output race while transferring axial force therethrough between said actuator plate and said thrust washer.

2. The torque device of claim 1 wherein said actuator plate also includes a centrally disposed hole, the contact ball for contact with the centrally disposed hole in the actuator plate and said set screw for adjustment of the pressure applied by the contact ball on the actuator plate.

3. The torque device of claim 1 wherein there are a greater number of holes in the actuator plate than in the radial flange.

4. The torque device of claim 3 wherein the holes in both the actuator plate and flange are disposed about the same circular locus.

5. The torque device of claim 1 wherein the first thrust member also is comprised of a Belleville washer and a distal end cap and retainer ring.

6. The torque device of claim 1 wherein the contact ball engages a center hole in the actuator plate and is engaged by the set screw that engages with internal threads in an adjusting nut, said adjusting nut being supported in said body.

* * * * *